United States Patent [19]

Gerrard

[11] 4,136,277

[45] Jan. 23, 1979

[54] EXPOSURE CONTROL SYSTEM FOR A DOCUMENT COPYING MACHINE

[75] Inventor: James A. Gerrard, Hanslope, England

[73] Assignee: Xerox Corporation, Stamford, Conn.

[21] Appl. No.: 753,325

[22] Filed: Dec. 22, 1976

[30] Foreign Application Priority Data

Dec. 30, 1975 [GB] United Kingdom ............... 53119/75

[51] Int. Cl.[2] .......................... G01J 1/32; G03B 7/08; G03B 27/74

[52] U.S. Cl. ........................................ 250/205; 355/68

[58] Field of Search ........................... 250/205; 355/68

[56] References Cited

U.S. PATENT DOCUMENTS

| | | | |
|---|---|---|---|
| 3,914,049 | 10/1975 | Basu et al. | 355/68 |
| 3,947,117 | 3/1976 | Basu et al. | 250/205 X |
| 3,986,022 | 10/1976 | Hyatt | 250/205 |

*Primary Examiner*—Palmer C. Demeo

*Attorney, Agent, or Firm*—Ronald L. Taylor

[57] ABSTRACT

An automatic exposure system for a copying machine comprising a scanning optical system having an imaging period and a calibrating period, including a lamp illumination control loop for providing a calibrated control signal, said control loop comprising means for supplying a reference control signal to the lamp means during the calibration period, a multiplying digital to analogue convertor arranged to respond to the output of a light intensity detector positioned to receive light reflected during the calibration period from a document to be copied, a comparator for comparing the output of the digital to analogue convertor and the reference control signal and for controlling the countdown of a digital counter to equalize the convertor output and reference control signal, and circuit means for maintaining said counter output constant during a subsequent imaging period and for supplying a predetermined input to the digital to analogue convertor to generate as its output said calibrated control signal.

1 Claim, 3 Drawing Figures

EXPOSURE CONTROL SYSTEM FOR A DOCUMENT COPYING MACHINE

BACKGROUND OF THE INVENTION

The invention relates to an exposure control system primarily, though not exclusively for an electro-statographic copy machine.

In the practice of xerography, as described for example, in U.S. Pat. No. 2,297,691 to Chester F. Carlson, a xerographic surface comprising a layer of photoconductive insulating material affixed to a conductive backing is used to support electrostatic images. In the usual method of carrying out the process, the xerographic plate is electrostatically charged uniformly over its surface and then exposed to a light pattern of the image being reproduced to thereby discharge the charge in the areas where light strikes the layer. The undischarged areas of the layer thus form an electrostatic charge pattern in conformity with the configuration of the original light pattern.

The latent electrostatic image can then be developed by contacting it with a finely divided electrostatically attractable material such as a powder. The powder is held in image areas by the electrostatic charge on the layer. Where the charge is greatest, the greatest amount of material is deposited; and where the charge is least, little or no material is deposited. Thus, a powder image is produced in conformity with the light image of the copy being reproduced. The powder is subsequently transferred to a sheet of paper or other surface and suitably affixed thereto to form a permanent print.

It can be readily appreciated that the quality of the print is, in the large part, dependent on the exposure of the charged xerographic plate to the radiation image. The largest single factor affecting exposure latitude, i.e., range of illumination intensity, is the efficiency of the developer system. In other words, if the developer system is highly sensitive so as to develop background or image portions as "grey" areas when in reality these are white, then illumination control must be commensurately sensitive to provide the proper exposure of the charged xerographic surface. With modern-day improvement to xerographic developer systems, the desirability of maintaining proper illumination becomes increasingly apparent.

A uniformly high level of illumination as required for exacting exposure is complicated by many factors. For example, variation in lamp output due to lamp aging or deterioration is sufficient to cause development of white areas thereby detracting from overall quality of the print. It has been determined, for example, that deterioration of some lamps is dependent on properties of their phosphor coating. The deterioration characteristics of aperture lamps having the same type of phosphor coating do not differ significantly. The deterioration of certain types of such lamps can be as much as 40% after approximately 1,000 hours of use. Such a large change in illumination level cannot be tolerated in modern copying systems. Thus, such lamps are generally replaced after a time period much earlier than the 1,000 hours' deterioration period mentioned hereinabove.

Some prior art proposals for compensating for variation in lamp output utilize photosensitive devices, such as photocells, which measure lamp output and adjusts various machine parameters to compensate for the variation in lamp output. The present invention relates to and is particularly suitable for providing intensity of illumination compensation in an electrostatographic machine which includes a scanning optical system.

A copying machine such as that described in British Patent specification 995413 uses an optical system comprising two fixed mirrors with a lens between the mirrors, the stationary original being illuminated by lamps on a movable lamp carriage, and light from the original being screened from the projection system except for a small slit between the lamps. British Patent specification 1,122,622 describes a document copying machine in which the whole of the stationary original is illuminated during exposure, and scanning is achieved by oscillating one of the mirrors of the projection system about an axis in its plane. It has been proposed, for example, in the U.S. Pat. No. 3,642,366 to have a more compact image projection system in which two mirrors are moved in different directions at speeds relating to the speed of movement of the photosensitive surface.

In copiers having optical systems of the kind already mentioned and generally any copiers relying on a photosensitive response, it may be desirable to adjust the illumination of the document to be copied to maintain as far as possible a constant irradiance at the image plane, that is at the photosensitive surface of photoreceptor. This constant irradiance is desirably achieved for various original document background reflectivities and as far as practical in some cases, despite aging or other forms of deterioration of the optical system, and deterioration of lamps.

In many copiers, copies provided depend for their definition on the difference of light intensity between the light and dark part of the original document to be copied so that adjustment of the illumination of the document may not be so critical. However, in a copier as described in U. K. Pat. No. 880,597 the definition of the copies made depends, in effect, on the actual value of the illumination received, rather than a differential value, so that ensuring near-constant irradiance received at the photoreceptor surface for differing types of original, that is, for each individual original, becomes even more important.

OBJECT OF THE INVENTION

It is an object of the present invention to provide an improved exposure control system suitable for an electrostatographic copier machine having a scanning optical arrangement.

SUMMARY OF THE INVENTION

According to the invention, there is provided an automatic exposure system for a copying machine which includes a scanning optical system having an imaging period and a calibrating period, including a lamp illumination control loop for providing a calibrated control signal, said control loop comprising means for supplying a reference control signal to the lamp means during the calibration period, a multiplying digital to analogue converter arranged to respond to the output of a light intensity detector positioned to receive light reflected during the calibration period from a document to be copied, a comparator for comparing the output of the digital to analogue convertor and the reference control signal and for controlling the count-down of a digital counter to equalize the converter output and reference control signal, and circuit means for maintaining said counter output constant during a subsequent imaging period and for supplying a predetermined input to the digital to analogue convertor to generate as its output said calibrated control signal.

BRIEF DESCRIPTION OF THE DRAWINGS

An automatic exposure system for a copying machine according to the invention will now be described by way of example with reference to the accompanying drawings in which.

DETAILED DESCRIPTION OF THE INVENTION

Figure 1:
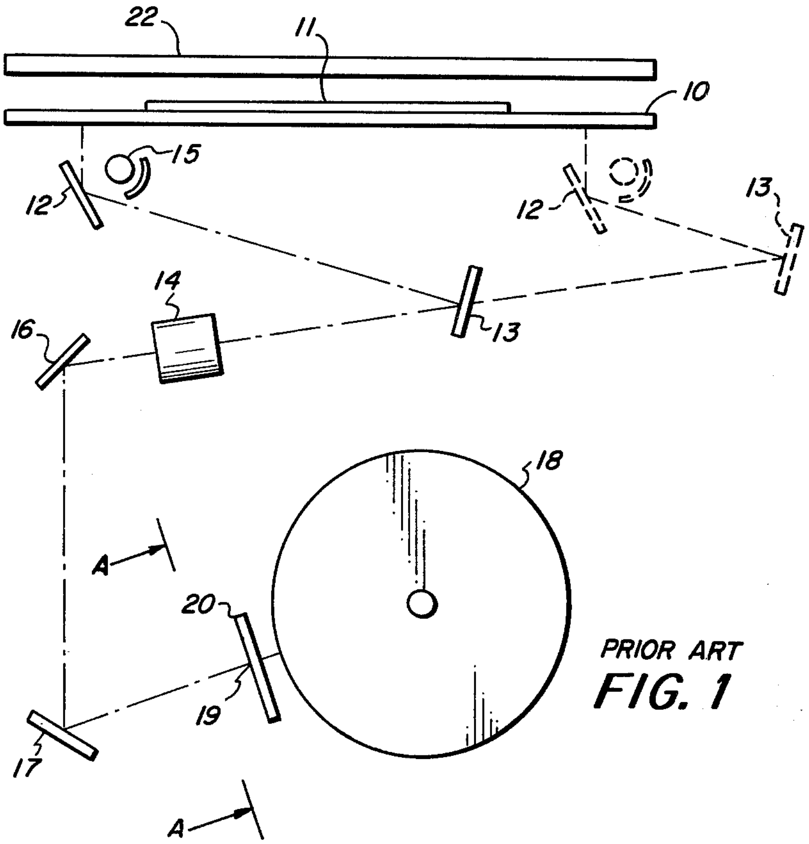
PRIOR ART FIG. 1
FIG. 1 shows a schematic view of an optical scanning system of the copying machine.

Referring to the drawings, a platen 10 is provided to support a document 11. A scanning mirror system includes two movable mirrors 12 and 13 shown in their extreme left and right positions in full and dotted outline respectively. The mirror 13 is arranged to move at half the speed of the mirror 12 during scanning or imaging to maintain the optical distance constant between the document 11 and a lens 14. A tubular lamp 15 extending across the platen 10 parallel to the mirror 12 moves with the mirror 12. The lamp 15 is provided as illumination means to illuminate the document 11 through the platen 10 during scanning.

Figure 2:
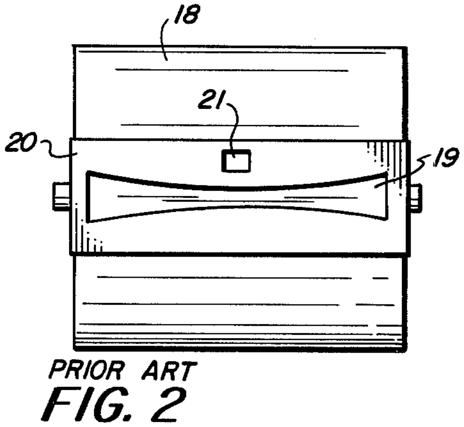
PRIOR ART FIG. 2
FIG. 2 shows a view A—A of FIG. 1.

An optical path extending from the platen 10 to the lens 14 continues beyond the lens to be reflected in sequence by mirrors 16 and 17 towards a photoreceptor 18. An optical slit 19, better seen in FIG. 2, is provided in a cover plate 20. The slit is used to restrict the image field and thus preserve image quality. A light intensity detector 21 (see FIG. 2) is mounted on the plate 20 adjacent the slit 19. A platen cover 22 is laid over the document 11.

The configuration or shape of the slit is as shown, being narrower at its mid-point than at its extremities. This shape, as is already known in the art, is primarily to compensate for the uneven distribution of illumination inherent in the lamp 15. Other shapes can be provided for lamps having different distribution characteristics. The photoreceptor could be as fully described and illustrated in U. K. Pat. No. 880,597; that is, in which a latent image is formed xerographically on the photoreceptor 18 and then developed by a liquid development process.

In general operation, the document 11 is scanned by the sweep of the mirrors 12 and 13 from left to right forming a latent image of the document on the photoreceptor 18 which rotates in synchronism with the movement of the mirrors 12 and 13. The intensity of illumination incident on the document in the present example is determined by the magnitude of the electrical supply to the drive circuit of the lamp 15. To provide good copies of originals of widely differing reflectance properties, we alter the illumination of the originals according to their reflectivity. In the embodiment, this is achieved during a rescan period (i. e. a calibration period) of optical scanning system by controlling the supply to the lamp 15 in dependence upon the maximum intensity of light received at the detector 21 during that period.

In the described embodiment, the detector 21 is positioned adjacent to the photoreceptor 18 and where the image is in focus. This is the preferred position so that any variations or deteriorations of the components of the optical system will be taken into account by the operation of the detector 21. The detector 21 could be placed in some other part of or adjacent to the optical path provided means are provided to focus an image at that point. An auxiliary lens or mirror may be provided for example. Also, more than one detector could be provided across the width of the slit, for example.

Figure 3:
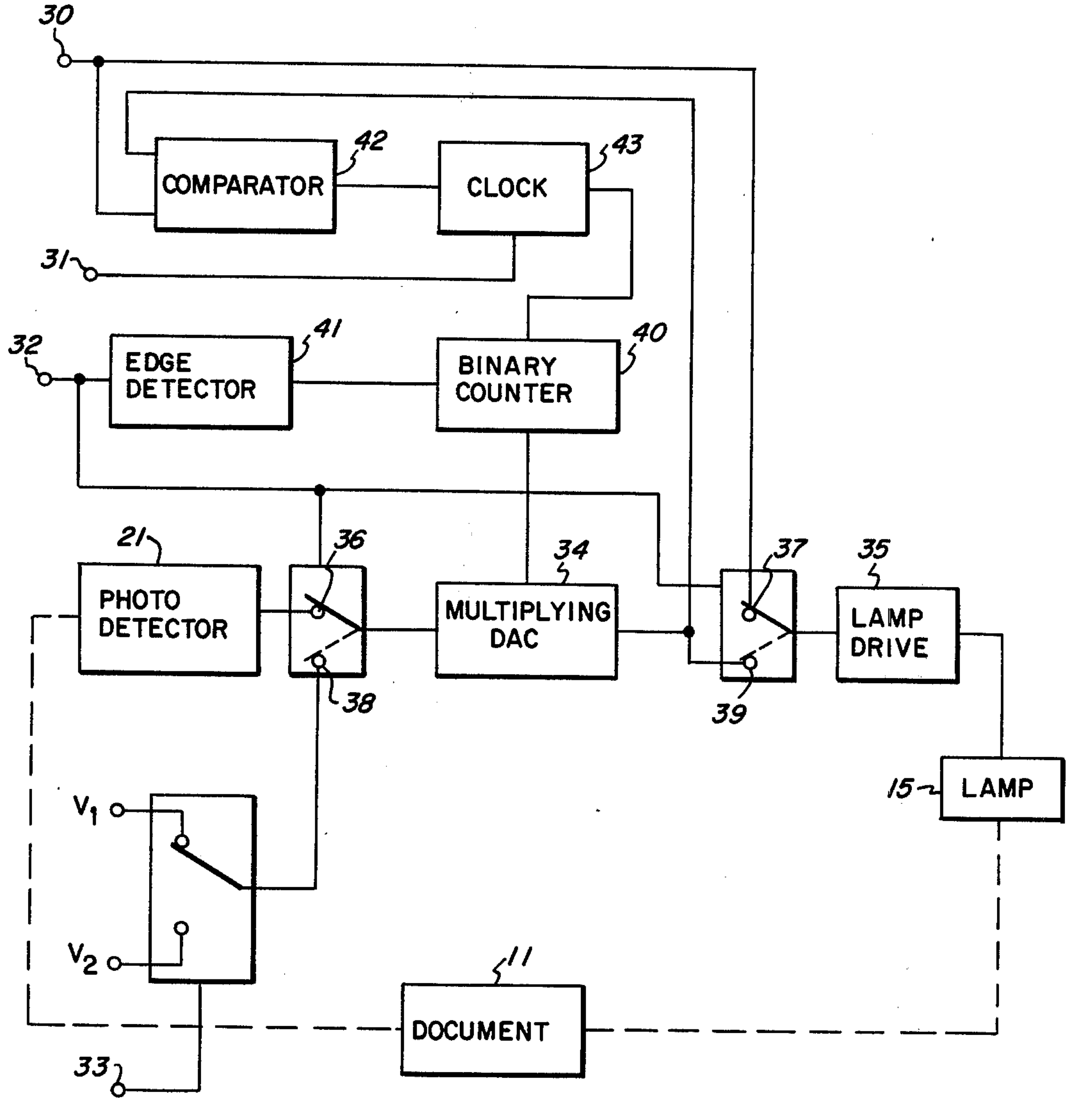
FIG. 3 shows a schematic diagram of the automatic exposure control system.

The circuit of FIG. 3 is provided with four input terminals 30 to 33. The main components of the circuit comprise the photodetector 21, a multiplying digital to analogue converter (DAC) 34 and a lamp drive circuit 35. In rescanning mode or calibration mode the photodetector 21 is connected through a switched terminal 36 to the DAC 34 and the power supply circuit 35 is connected through a switched terminal 37 to the input terminal 30. In scan mode or imaging mode, the input of the DAC 34 is connected by a switched terminal 38 to one of two voltage sources, V1 for normal copying and V2 for dark originals copying, selectively switched under the control of a supply to the terminal 33. At the same time the output of the DAC is connected through a switch terminal 39 to the drive circuit 35.

An 8-bit binary counter 40 having its output connected to the DAC 34 is reset to maximum count by an edge detector circuit 41 energized in turn by a supply at the terminal 32. The supply to the terminal 32 is also arranged to switch the connections at terminals 36 to 39 as required.

A reference voltage VR supplied in use to terminal 30 for application to the drive circuit 35 through the terminal 37 is also supplied to a comparator 42 which compares VR with the output of the DAC 34. The comparator 42 is arranged to control a clock 43 which is arranged in turn to supply countdown signals to the counter 40. The clock 43 can be inhibited by a voltage applied to terminal 31.

A typical sequence of operation of the circuit of FIG. 3 is as follows:

At the beginning of rescan a voltage is applied to terminal 32 which sets the terminal connections 36 to 39 to the rescan configuration. The leading edge of this voltage is detected by circuit 41 which responds thereto and resets the counter 40 to its maximum count. The output (Z) of the counter 40 is supplied to the DAC 34. The drive circuit 35, controlled by VR at terminal 30, supplies lamp 15 which illuminates the document 11 to be copied; the intensity of illumination is VR × KL (KL equals factor of lamp coefficient and lamp drive circuit). The illumination reflected from the document VR × KL ×$\alpha$(where $\alpha$is the proportion of reflected light indicative of the document background irradiance, that is the reflectivity of the document). The reflected light is sensed by the photodetector 21 to produce an output equal to VR × KL ×$\alpha$× Kp (where KP is a photodetector factor), which is supplied to the DAC 34. The output of the DAC 34 equals VR × KL ×$\alpha$× Kp ×Z and this is compared at the comparator 42 with VR. If the output of the DAC 34 is higher than VR, the clock 43 is released and provides countdown signals to the counter 40 and so reduces Z until VR × KL ×$\alpha$× Kp × Z equals VR. Thereafter, the counter 40 is held with its count at:

$$+1$$

$$KL \times Kd \times \alpha$$

As the rescan continues, no further counts take place unless a higher level of illumination is sensed by the photodetector 21 resulting in the output of the DAC 34 rising above VR again. Thus the output of the DAC 34 settles down to a value corresponding to the level of maximum reflectivity of the document to be copies.

After, the rescanning the supply at terminal 32 is changed to switch the terminals 36 to 39 into scanning mode. A signal is applied to terminal 31 to inhibit any further clock pulses for the time being. The input to the DAC 34 during scanning is derived from supplies V1 or V2 as required, and a multiple of this supply (i.e. V1 $\times$ Z, or V2 $\times$ Z) is supplied to the lamp drive circuit 35 to provide the required level of illumination for copying.

The automatic exposure circuit described has several advantages over earlier and analogue proposals. The digital information (Z) pertaining to the document reflectivity is stored in a virtually incorruptable form. Variations in VR and lamp illumination output during rescan do not affect calibration as the basic circuit compares Z and variations in the inverse of the document reflectivity.

Another advantage is that as in the described embodiment the photodetector can be operated within any range, so the illumination, dependent on VR during rescan, can be set at a level to suit an optimum operating or sensing range for the photodetector. In general, the photodetectors tend to operate more reliably at high level of illumination and we arrange for maximum illumination during rescan which has minimum impact on reducing the life of the lamps and drive circuit components.

In the described embodiment, the calibration period consists of the rescan period enabling calibration of the system according to the reflectivity of the document to be copied. Calibration can, however, take place during a nonimaging initial forward scan of the document followed by an imaging forward scan. It is more convenient, although not essential, to achieve calibration during a prescan or rescan period as in the embodiment described.

In the embodiment there is a requirement for a counter which, in positive logic, counts down. Such a device is not available as a standard CMOS circuit. It could easily be implemented from a number of chips by inverting all the outputs. However, the increase in circuit complexity and cost can be avoided by making use of a feature of the particular DAC used. This multiplying DAC has complementary outputs. The normal output of a current proportional to the product of the digital and analogue inputs. In addition, an output is provided which is maximum when the normal output is zero and, conversely, zero when the normal output reaches its maximum. In between these extremes the complementary output decreases linearity as the counter is incremented. When this complementary output is used, the effect is exactly that which would be achieved by employing a negative incrementing counter. It follows, therefore, that whereas the term 'countdown' is used, this method or similar methods of achieving countdown effect is included within the scope of the invention.

Whilst a particular embodiment of the invention has been described above, it will be appreciated that various modifications may be made by one skilled in the art without departing from the scope of the invention as defined in the appended claims.

What is claimed is:

1. An automatic exposure system for a document copying machine which includes a scanning optical system having an imaging period and a calibrating period, said scanning optical system comprising:

a lamp illumination control loop for providing a calibrated control signal, said control loop comprising means for supplying a reference control signal for use in controlling illumination during the calibration period;

a light intensity detector positioned to receive light reflected during the calibration period from a document to be copied;

a multiplying digital to analogue convertor arranged to respond to the output of said light intensity detector;

and counter means for providing a digitized down count output;

a comparator for comparing the output of said digital to analogue convertor and the reference control signal and for controlling the countdown of said counter means to equalize the output of said convertor and the reference control signal, and circuit means for maintaining the output of said counter means constant during a subsequent imaging period and for supplying a predetermined input to said digital to analogue convertor to generate as its output said calibrated control signal.

* * * * *